United States Patent [19]
Frueh

[11] 3,820,639
[45] June 28, 1974

[54] BRAKE RELEASED THROTTLE HOLDER

[76] Inventor: John J. Frueh, 806-W. 167th St., Gardena, Calif. 90247

[22] Filed: June 25, 1973

[21] Appl. No.: 373,108

Related U.S. Application Data

[63] Continuation-in-part of Ser. No. 306,717, Nov. 15, 1972, abandoned.

[52] U.S. Cl. .................. 192/3 T, 74/527, 188/67
[51] Int. Cl. ............................................. B60k 29/02
[58] Field of Search .......... 192/3 T; 74/527; 188/67

[56] References Cited
UNITED STATES PATENTS

| | | | |
|---|---|---|---|
| 2,846,035 | 8/1958 | Heath | 192/3 T |
| 2,917,142 | 12/1959 | Thorner | 192/3 T |
| 3,386,542 | 6/1968 | Cummings | 192/3 T |
| 3,439,783 | 4/1969 | Graham et al. | 192/3 T |

Primary Examiner—Benjamin W. Wyche
Attorney, Agent, or Firm—Howard L. Johnson

[57] ABSTRACT

Mechanical assembly for installation on automobile to set carburetor fuel supply at whatever driving level has been obtained by operator-activated accelerator pedal, set merely by his pulling dashboard knob at such speed. Setting can be transiently overridden by further depression of accelerator which then automatically returns to prior setting upon release of foot pressure. Alternately any brake pedal activation completely discharges setting. Simple non-electrical unit employs free piston which is magnetically detachably coupled to axially traversing control rod which is distally attached to accelerator pedal. Rotationally operating clutch (activated by pull knob) locks piston to housing at selected control position, leaving control rod available for further overriding depression but restrained from retraction beyond piston-set position.

10 Claims, 3 Drawing Figures

PATENTED JUN 28 1974  3,820,639

BRAKE RELEASED THROTTLE HOLDER

This is a continuation-in-part of SN 306,717, filed Nov. 15, 1972.

BACKGROUND OF THE INVENTION

This invention relates to a control mechanism or subassembly which for its here-exemplified use may be easily attached to an automotive vehicle so as to enable the driver to set any desired rate of fuel supply to his engine, such as corresponds to a selected cruising speed, which preset rate can at any time be transiently overridden by further depressing the gasoline pedal, or which control can be released entirely by a simple tap on the brake pedal. If the set rate is momentarily accelerated by further depressing the gas pedal (as to obtain a quick burst of speed). Upon release the pedal will then return to its previously set position (but will not return further to idling position), and the driver may remove his foot completely from the pedal and continue cruising at the set feed rate. Such setting may be initiated and changed (or alternately may remain unused) at any time and as often as desired. The added assembly does not otherwise alter the normal operation of an automobile and may even be removed and reinstalled on another vehicle if desired.

Attempts have been made in the past to devise automatic speed controls for motor vehicles, which controls operated to vary the fuel supply to the motor so as thereby to maintain a fixed speed of the vehicle, such as that of the maximum speed limit of a particular highway. If the vehicle started up a grade, the motor consequently had to be automatically accelerated; on a decline it would be correspondingly decreased. However such mechanism which correlated the vehicle speed with the rate of motor operation was complicated and expensive, both for manufacture and installation. In addition, whenever an automatic limit is placed on a vehicle speed, inevitably emergencies arise when it becomes highly desirable or even essential to momentarily exceed such limit, as for example, to avoid a possible accident or collision. If such necessary accommodation at a critical moment, requires reflection and manipulation on the part of the driver, to this extent at least, it becomes unacceptable.

BRIEF DESCRIPTION OF THE INVENTION

Accordingly it is an object to provide such a comparatively simple mechanism which operates merely by holding the gasoline pedal depressed to a predetermined level which is selected at the moment of use, which setting can be cancelled and reset at any time and as often as desired, and which setting is automatically discontinued as by a mere tap on the vehicle brake pedal (whether or not the driver wishes to brake the vehicle). Once set, the driver can completely remove his foot from the fuel pedal, or can transiently further depress it as often as wished so as to increase the feed rate and engine operation beyond the set rate (to which the control will repeatedly return it.)

Anchorage at such a forward position is effected by a piston disposed in a housing conveniently installed on the engine side of the vehicle fire-wall, the piston being traversed by a control rod which has its outer end affixed to the vehicle fuel pedal for longitudinal reciprocation in unison therewith. At its initial or idling position (that is, the spring-urged idling position of the gasoline pedal), the control rod is magnetically held to the piston for joint movement therewith. A radially projecting, spring retracted, lever arm extends from a longitudinal groove of the piston through a slot in the cylinder wall which thus permits a limited arcuate movement (e.g., 30') of the piston within the housing and about the control rod Such arcuate movement of the piston by the lever arm (from an initially advanced position of the engaged rod and piston) locks the rotated piston to its housing and simultaneously permits disengagement of the piston from the control rod so that the latter can then be moved further through the thus-anchored piston but the latter serves as a stop for further retraction of the rod. Locking engagement of the piston with the housing is effected by a generally chordal tooth or teeth fixedly projecting within the housing so as normally to overlie a longitudinal flat face or surface of the piston, which face is adjacent a longitudinally parallel series of transverse comb-like grooves formed along a strip of the piston; arcuate rotation of the piston toward a tooth thus engages the latter with whichever groove is in line therewith. Hence such engagement can be effected anywhere along the piston length, to which it has been moved by the rod.

One end of a cable is fixed to the outer end of the lever arm, then looped around a drum, and thence connected to a pull knob mounted at a location handy to the driver, such as the vehicle dashboard. A spring-loaded friction brake normally holds the drum against rotation (to prevent retraction of the drawn cable). To lock the rod-advanced piston at a position corresponding to a particular amount or extent of depression of the fuel pedal, the operator merely draws the pull knob and cable so as to arcuately turn the lever arm and piston the possible 30°, thus tooth-and-groove locking the axially advanced piston to its housing and unlocking the coaxial rod from the piston for possible independent advance therebeyond.

A second rod longitudinally transects the vehicle firewall, forwardly spring-urged with its end disposed adjacent a contact roller which is mounted beneath the vehicle brake pedal. The other end, disposed within the engine compartment, is aligned with a pivoted trigger disposed to momentarily release the drum brake and thus allow the spring-biased lever arm and its attached cable to retract, thereby disconnecting the piston from housing-engagement and permiting its re-engagement to a magnet carried by the coaxial control rod. It may be noted that the entire assembly is mechanical and has no need of an electrical system or circuitry; hence it is easily installed by an unskilled worker.

BRIEF DESCRIPTION OF THE DRAWINGS

FIG. 1 is a vertical sectional view through the respective fire-wall and floor of the driver's compartment of an automotive vehicle, showing in elevation the present control mechanism traversing said walls and connected to the brake pedal and fuel pedal of the vehicle.

FIG. 2 is a horizontal sectional view through the firewall, brake pedal and a segment of the dash board, with the control mechanism appearing in top plan.

FIG. 3 is an elevational view of the control mechanism and fire-wall view from the left of FIG. 1 with the shift lever arm in piston-disengaged position and its engaged position indicated in broken lines.

DETAILED DESCRIPTION OF PREFERRED EMBODIMENT

As here illustrated in a presently preferred form for installation in motor vehicles to provide a constant fuel flow to the engine or carburetor, the assembly is shown mounted on both sides of and traversing the fire-wall W which separates the engine compartment E from the driver's compartment D. Above the floor board 63 there is the customary foot brake B and an adjacent accelerator of fuel pedal A, laterally separated for alternate pressure by the right foot of the driver. The fuel pedal A is pivoted to a carburetor linkage 62 and normally held in an idling position by a spring S, in opposition to which spring force the driver presses the pedal A. Such balancing linkage may of course be situated at other locations, including inside the engine compartment. At a higher level within the driver's compartment, in position for manual operation is a pull knob 42 attached by a fitting 55 to the dashboard 56 and used for "setting" the rate of fuel flow at an obtained level as subsequently described.

Figures 1, 2, 3:
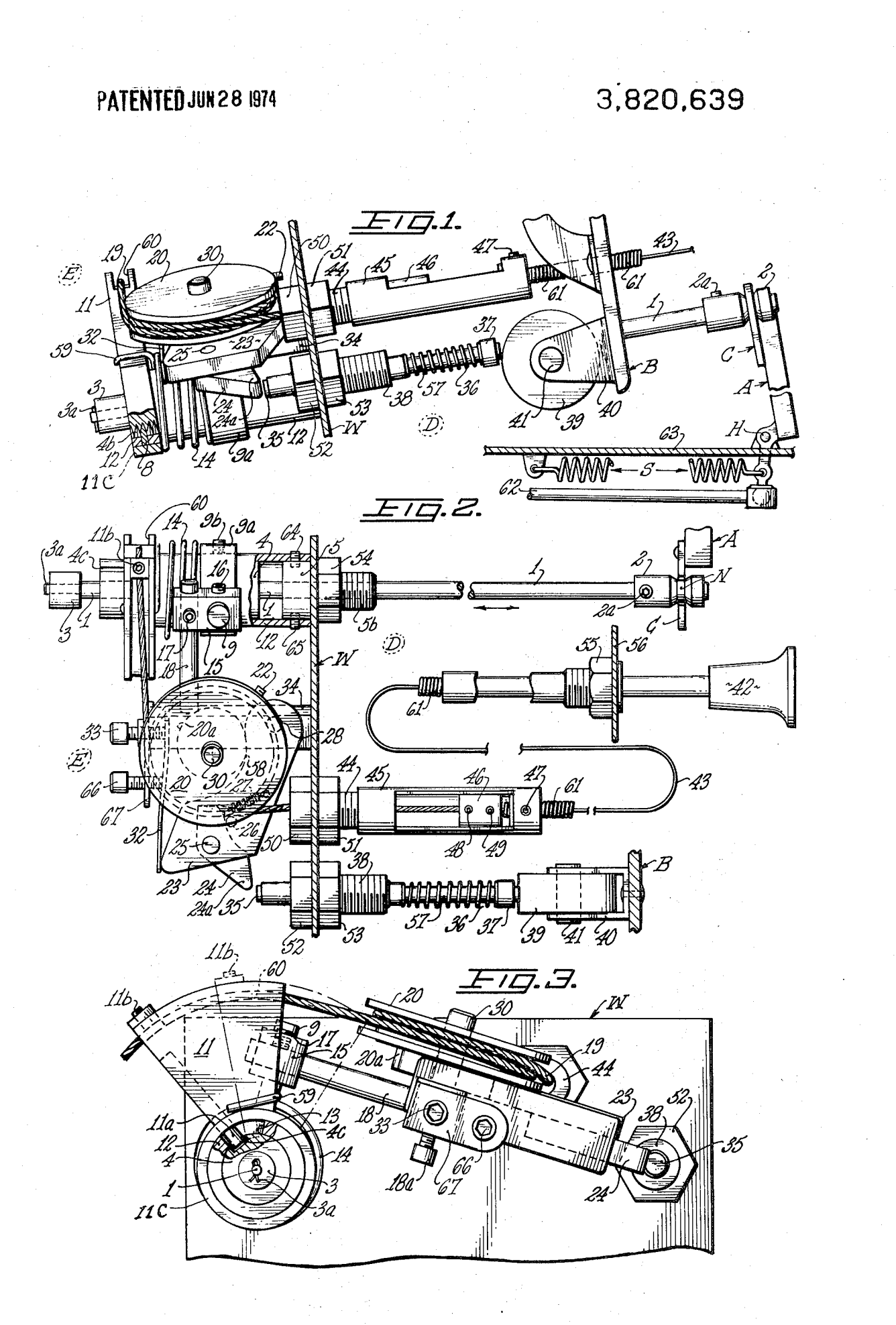

There is a cylindrical connecting rod 1 (FIG. 2) having its proximate end secured to a coupling collar 2 by a screw 2a. A restricted neck N of the coupling is socketed in a plate C which extends radially from the collar and is attached to the underface of the fuel pedal A so that the rod can be moved reciprocably lengthwise as the pedal is rocked about its hinge point H by the operator. The distal end of the rod slidably traverses a piston 4 which is located in a cylindrical housing 12. The latter is fastened to the engine side of the fire-wall W by a coaxial tubular mounting bolt 5, the externally threaded, projecting end of which 5b carries an anchoring nut 54 which is tightened against the fire wall. The housing 12 is secured to the embraced bolt by a pair of set screws 64, 65.

The rod 1 is longitudinally slidable through the bolt 5 and through its threaded stud 5b, and the piston 4 is lengthwise movable within the housing 12 and partway out of the distal end by its terminal connection to a magnetic stop ring or attachment element 3 carried by the rod and attached thereto by a cotter pin 3a.

The piston 4 is formed with a longitudinal strip of transverse comb-like grooves 4b, and projecting chordally from the adjacent housing wall 12 is one or more projecting teeth 8 (FIG. 1) which upon arcuate turning of the piston toward the teeth will engage such tooth or teeth by seating in the particular groove(s) which is opposite. Such small amount of rotation locks the piston against axial displacement in either direction, at whatever lengthwise location it happens to be when thus turned. The rod 1 can then be further entended through the locked piston (to the left in FIG. 2) and will return to this "set" or "locked" position, but not further to its seated or idling position as long as the piston is thus held.

Intermediate its length, the housing 12 carries a fixed ring 9a and distally spaced from this is a partially rotatable ring 11c having a fan-shaped radially outward projecting lever arm 11 with a radially inward directed pin 11a seated in a longitudinal groove 4c of the piston after traversing an arcuate slot 13 in the housing 12; the span of this slot, say 30°, determines the possible rotation of the piston as effected by the pin 11a. Between the two rings 9a and 11c is a helical torsion spring 14 disposed about the housing 12 with one end anchored to the post 9 and the other end 59 engaging the lever arm 11 so as resiliently to retain the pin 11a and piston 4 in the piston-slidable position--i.e., unlocked by the key 8.

The fire-wall W is also traversed by an externally threaded guide tube 38 held by the lock nuts 52, 53 and by another threaded guide tube 44 secured by a pair of opposing nuts 50, 51. A generally horizontal housing block 34 is mounted with one end disposed in abutment with the inner face of the fire-wall W. A cylindrical bar 18 held by a set screw 18a extends laterally from the block and traverses a coupler 15 to which it is fastened at a selected position of insertion by a set screw 17 (FIG. 2), thus enabling accommodation of different spacings along the fire-wall between the mounting bolt 5 and the guide tube 44. The coupler 15 locates the support post 9 arising from the housing ring 9a and anchored by a set screw 16.

An axle pin 30 arises from the block 34 to support a pulley wheel or drum 20 which has a dependently projecting hub 20a. A friction brake 23 is pivotally mounted at 28 on the block, the brake being disposed in position normally to abut the drum hub 20a at the point 58, being urged thereagainst by a leaf spring 32, one end of which is retained in a slot of the block by a screw 33 and adjustably tensioned by another screw 66 held by bracket 67.

The outer end of the lever arm 11 is formed with an arcuate channel 60 in which is laid a cable 19, terminally secured by a screw 11b and thence looped about the drum 20 to which it is fastened by a screw 22. The cable is then led through the guide tube 44 to a tubular housing 45 on the driver's side of the fire-wall W. Reciprocally disposed within the housing is a coupler 46 to which the cable and pull wire 43 are each attached by respective screws 48, 49. The wire 43 is encased in flexible sheathing 61, anchored by screw 47, and at its outer end if connected to a pull knob 42 which is anchored to the automotive dashboard 56 (or to a bracket attached thereto) by the fitting 55 (FIG. 2) or the like.

A trigger 24 is pivotally mounted on the spring-contacted segment of the brake 23 by a pin 25, being spring-urged to the illustrated position. The contact end 24a of the trigger is in line for propulsion by the end 35 of the rod 57 when the latter is pushed lengthwise through the guide tube 38 (against the force of an expansion spring 36 anchored by collar 37) by initial depression of the vehicle brake pedal B. Such consequent momentary release of the friction brake 23 from the drum hub 20a causes the torsion spring 14, 59 to retract the cable 19 and by rotation of the piston 4 to disengage the groove(s) 4b from the tooth or teeth 8. The control rod 1 being at the same time retracted by the fuel pedal A returning to idling position by action of its own spring S (FIG. 1), the stop magnet 3 again abuts and holds the distal end of the piston, thus recoupling the rod and piston for any subsequent advance in unison.

When further extension of the contact 35 may cause the latter to travel beyond its terminal engagement with the trigger end 24a (FIG. 1) by reason of the brake 23 swinging laterally on its axle, subsequent engagement of the trigger arm 24a with the side of the pin 35 is prevented from resultant binding of the two by reason of pivotal mounting of the trigger 24; that is, as the rod 57 is retracted by action of the spring 36, its edgewise movement along the trigger 24a (from left to right in FIG. 1) is accommodated by the spring mounting of the latter by the spring 27.

In this connection it is important to observe the function of the contact roller 39 in its mounting beneath the brake pedal B. Since the ordinary brake pedal operates as a lever, it would not normally be depressed in parallel alignment with such rod 57; in such case, if the brake pedal made simply a point contact with the end of the rod, continued arcuate movement of the pedal contact might either lock it with the rod or alternately might completely disengage from it, in either event making unlikely any automatic resetting of the two elements for subsequent function. However, with a rolling contact of the wheel 39, there is no possible disengagement of the wheel from the reciprocable rod nor is there any possibility of the two binding or locking.

It should be pointed out that the carburetor-connected spring S (FIG. 1) which normally biases the accelerator pedal A (and simultaneously the connected control rod 1) to the normal idling position in an automobile, is an essential element of the present control mechanism; but it would not ordinarily be included in such a kit for installation on an automobile since it is already present and functioning on the vehicle.

It will be apparent that various modifications can be made from the specific details here depicted. Thus automobiles which have manually operated accelerator and brake levers (such as used by paraplegics) instead of corresponding foot pedals, would have the present control mechanism connected to the hand-operated levers. Likewise, use of such control mechanism is not limited to automotive vehicles.

I claim:

1. Mechanism for progressive advancement and retraction and for selective intermediate position-holding of a longitudinally reciprocable control element, said mechanism comprising in combination:
   a tubular housing;
   a piston disposed within said housing, normally disposed to seat adjacent one end of the housing and being selectively progressively movable lengthwise therefrom and also partially rotatable therein;
   a control rod extending lengthwise through said piston and projecting therebeyond from said one end of the housing, being normally engaged with said piston for joint movement therewith;
   rotationally operable clutch menas adapted to effect mutual engagement of the piston and housing and permit simultaneous disengagement of the rod and piston at selected intermediate positions of advancement of the coupled rod and piston within the housing, and stop means comprising a piston attachment element carried by said rod whereby the rod is restrained from retraction from such intermediate position but left free for further advance through the thus-anchored piston;
   and means comprising a transversely movable lever operatively connected to said piston and projecting outward from said housing for normally holding said rotational clutch means in disengaged position.

2. Mechanism according to claim 1 wherein said clutch means is rotationally operable by external cable means and including associated brake means for selectively holding said cable means in position effecting clutch engagement of the piston and housing.

3. Mechanism according to claim 1 wherein said control rod is attached to and lengthwise reciprocable with movement of a fuel-supply regulating element of an engine.

4. Mechanism according to claim 2 wherein said control rod is attached to and lengthwise reciprocable with movement of a fuel-supply regulating element of a vehicular engine and said brake means are responsive to action of a brake lever of said vehicle, thus releasing said cable means and disengaging the piston and housing.

5. Mechanism according to claim 1 wherein said clutch means comprise a longitudinal series of transverse grooves formed along a side of said piston adjacent a planar face thereof, and transversely projecting tooth means disposed adjacent the inner face of said housing alignable for engagement of at least a selected one of said grooves upon rotation of said piston.

6. Mechanism according to claim 4 wherein said cable means is disposed for manual operation by a driver of said vehicle for effecting said clutch engagement.

7. Mechanism according to claim 4 wherein said brake lever is pedal operated and characterized by a contact roller dependently mounted thereon, a trip element reciprocably mounted for rolling contact by said roller, and trigger means disposed to transiently release said cable-holding brake means, thereby effecting disengagement of said piston and housing.

8. Mechanism according to claim 1 wherein said stop means comprise a magnetic element carried by said control rod and serving to couple said control rod and piston for joint movement between the position adjacent said one end and said intermediate positions of housing engagement of the piston.

9. Engine control mechanism of the character described, adapted for use on an automotive vehicle, comprising in combination:
   a tubular housing;
   a piston disposed within said housing, normally spring-biased for seating adjacent one end of the housing and being selectively and progressively movable lengthwise therefrom and also partially rotatable therein;
   a control rod extending lengthwise through said piston and projecting therebeyond from said one end of the housing;
   a magnetic element carried by said control rod and adapted for normally coupling the rod to the piston for joint movement therewith;
   rotationally operable clutch means adapted to effect mutual engagement of the piston and housing and permit simultaneous disengagement of the rod and piston at selected intermediate positions of advancement of the coupled rod and piston within the housing, whereby the rod is restrained from retraction relative to the piston but left free for further advance through the thus-anchored piston, said clutch means comprising a longitudinal series of transverse grooves formed along a side of the piston and transversely projecting tooth means disposed adjacent the inner face of said housing alignable for engagement with at least one of said grooves upon partial rotation of said piston;
   a shift lever connected to said piston and extending radially outward from said housing, being spring-biased normally to hold said clutch means disengaged and thus permit the rod and piston to be mutually engaged by said magnetic element; and cable means looped about a drum and connecting said shift lever with a manually operable pull element, said drum having resilient brake means adapted to hold the drum at an outdrawn position of the cable means, whereby the shift lever may be selectively retained at a clutch-engaging position.

10. Engine control mechanism according to claim 9 which additionally includes release elements for the brake means of said drum, comprising a contact roller adapted to be dependently mounted on an automotive brake pedal, a trip element reciprocably disposable for rolling contact by said roller, and trigger means disposable in response to said trip element to transiently release the cable-holding brake means of said drum, thereby effecting disengagement of said piston and housing.

* * * * *